Oct. 9, 1928.

F. J. HARDLEY

PULLEY

Filed Oct. 25, 1926

1,687,442

Frank J. Hardley, Inventor

By Lancaster and Allwine
Attorneys

Patented Oct. 9, 1928.

1,687,442

UNITED STATES PATENT OFFICE.

FRANK J. HARDLEY, OF LOS ANGELES, CALIFORNIA.

PULLEY.

Application filed October 25, 1926. Serial No. 144,103.

The present invention relates to pulleys, and more specifically to that type commonly known as split pulleys.

The primary object of the invention is to provide an improved type of split pulley which may be readily secured in position at any desired point along a shaft without the necessity of providing a key and key-way for locking the pulley to the shaft, and without requiring the shaft to be removed for placing of the pulley.

A further object of the invention resides in the provision of a split pulley embodying means for automatically clamping the pulley to the shaft when the pull of the belt or other drive means acts upon the pulley in one direction for causing the shaft and pulley to rotate as a unit, and which clamping means upon pull of the belt or other drive means in the opposite direction, automatically releases the pulley from the shaft for allowing the shaft and pulley to rotate independently of one another.

A further object of the invention resides in the provision of an improved type of keyless split pulley embodying roller means for binding the pulley onto the shaft when acted upon in one direction by the belt or other drive means, with the rollers so arranged that an even binding action is created upon the shaft longitudinally thereof throughout a substantial length of the pulley and thus prevents any possible torsional strain upon the pulley which might tend to cause the pulley to run eccentrically upon the shaft.

A still further object of the invention is to provide a split pulley embodying roller clutch means arranged at the bore of the pulley, with retaining means provided for the rollers of the clutch means whereby the rollers will be held in position during assembling of the pulley upon the shaft.

Other objects and advantages of the invention will be apparent during the course of the following detailed description, taken in connection with the accompanying drawing forming a part of this application and in which drawing.

Figure 1:
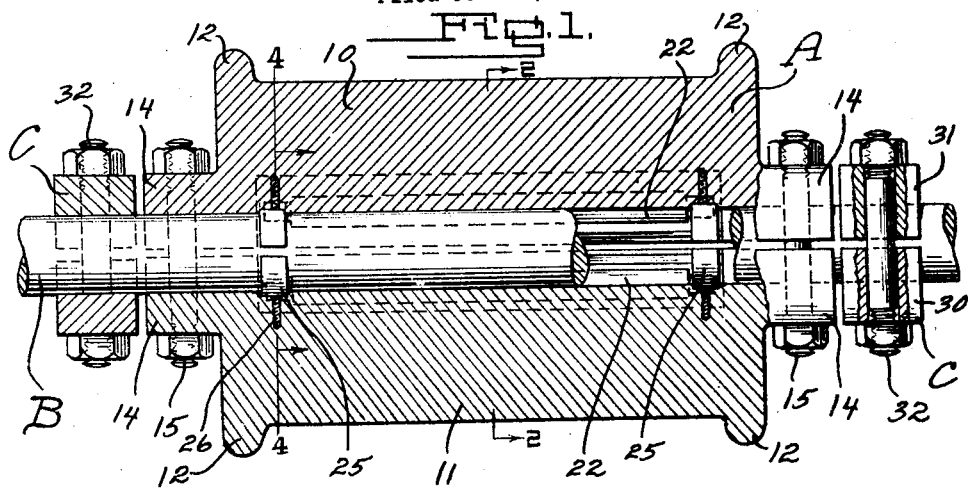
Figure 1 is a longitudinal section through a pulley constructed in accordance with my invention, the same being taken substantially along the line 1—1 of Figure 2 and showing the thrust or clamp collars for preventing lateral movement of the pulley on the shaft.

Referring to the drawing in detail, and wherein similar reference characters designate corresponding parts througout the several views, the letter A designates the pulley, B a shaft upon which the pulley A is mounted, and C retaining means for preventing lateral movement of the pulley A on the shaft B.

The pulley A, and which may be formed of cast iron and be of any desired diameter, comprises a pair of similarly formed semicircular sections or halves 10 and 11 preferably provided at their ends with flanges 12 which terminate flush with the flat confronting faces 13 of the sections. Formed integral with each end of each of the sections 10 and 11, are extensions or ears 14 preferably of a length equal to the diameter of the pulley, and which extensions or ears are adapted to receive clamping bolts 15 arranged one at each side of the shaft B, and which clamping bolts and extensions 14 serve for retaining the pulley sections 10 and 11 in assembled position upon the shaft.

Provided in each of the sections 10 and 11, and extending longitudinally at the flat confronting faces 13, thereof, are semi-circular shaped grooves 16 of a radius equal to that of the shaft B, and which grooves when the sections are in assembled relation form a longitudinally extending bore through which the shaft B extends. It is preferred that when the sections 10 and 11 are clamped in position upon the shaft B, that the confronting faces 13 thereof be slightly spaced apart as illustrated in Figures 1 and 2.

Figure 4:
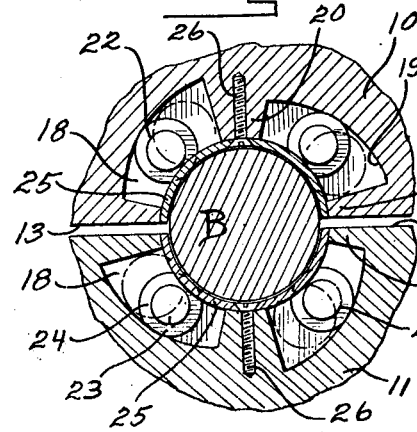
Figure 4 is an enlarged fragmentary section on line 4—4 of Figure 1 and showing the manner in which the rollers are retained in position when the pulley sections are disassembled.
Figure 5:
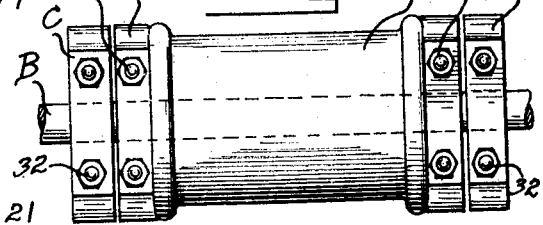
Figure 5 is a plan view on a reduced scale of the improved pulley together with its clamp collars.

Provided in each of the sections 10 and 11, and extending longitudinally of the sections and terminating inwardly of the ends of the sections, are channels 18 provided with cam faces 19. By observing Figures 2 and 4, it will be seen that these longitudinally extending cam channels are divided or spaced by a rib 20, and do not extend to the flat confronting faces 13 of the sections but are closed along their longitudinal sides by webs 21. By again observing Figures 2 and 4, it will be seen that the cam surfaces or faces 19 recede in a clockwise direction from the surface of the shaft B, and in the example shown are of greater radius than that of the shaft B and struck from a center eccentric to the axis of the shaft for causing the channels 18 to be of greater depth at one side or edge than at the opposite side or edge. The cam surfaces 19 all recede from the shaft surface in a like direction circumferentially of the shaft. The inner edges of the ribs 20 and webs 21 contact with the surface of the shaft B and form continuations of the semi-circular shaped grooves 16 so that the sections 10 and 11 have contact with the shaft throughout their lengths.

Disposed in each of the longitudinally extending channels 18, is a gripping roller 22 having reduced end portions 23 providing shoulders 24 adjacent each end of the rollers. These rollers 22 are of a length slightly less than that of the channels 18, and of a diameter greater than that of the depth of the channels at their shallow sides or edges.

Figure 2:
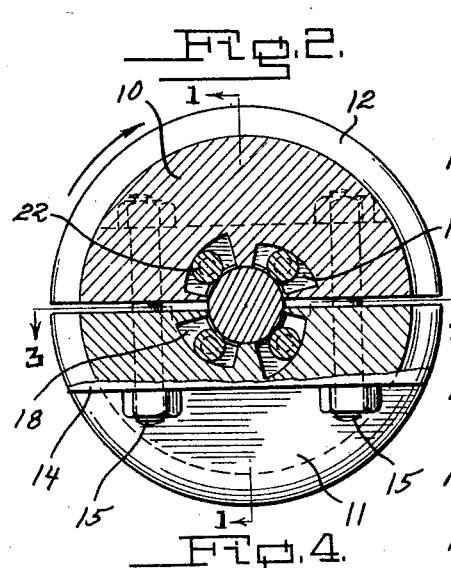
Figure 2 is a transverse section on line 2—2 of Figure 1 and looking in the direction of the arrows.

When a belt or other drive means is trained over the pulley A and acts in a direction as indicated by the arrow in Figure 2, the rollers 22 will be caused to move toward the shallow side of the channels and be wedged between the cam faces 19 of the channels 18 and the shaft surface in a manner for coupling the pulley to the shaft so that the pulley and shaft will rotate in one direction as a unit. When the belt or other drive means acts in a direction counter to that as indicated by the arrow in Figure 2, the rollers 22 will move to the deeper side or edge of the channels 18 and thus prevent movement of the pulley A being imparted to the shaft B.

It may here be well to state that the clamping bolts 15 are not tightened to a degree whereby the pulley sections will be clamped tight upon the shaft B, but that the bolts 15 are only tightened sufficiently for allowing the pulley to rotate freely upon the shaft. It will be seen that the semi-circular shaped grooves 16 provided at each end of the sections, form bearings for the pulley sections.

Figure 3:
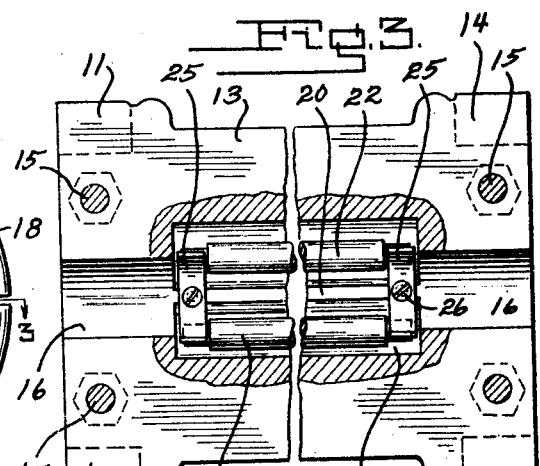
Figure 3 is a sectional view on line 3—3 of Figure 2 and showing portions broken away for illustrating certain details of construction.

Arranged at each end of the channels 18 in each of the sections 10 and 11, and extending across the end portions of the channels, are half circular springs 25 preferably held in position by means of screws 26 threaded into the ribs 20. These screws 26 are preferably provided with counter sunk heads which lie flush with the inner faces of the springs 25, for presenting a smooth inner surface to the springs. The springs 25 are preferably set into the inner edges of the ribs 20 and webs 21 so that the inner surface of the springs conform with the curvature of the semi-circular shaped grooves 16. By observing Figure 4 it will be seen that these springs 25 serve to retain the rollers 22 in position when the pulley is dis-assembled, and by observing Figure 3 it will be seen that these springs engage the shoulders 24 at opposite ends of the rollers and act as abutments for limiting lateral shifting of the rollers. The reduced end portions 23 of the rollers 22 do not contact with the springs 25 owing to the fact that the shoulders 24 are of greater depth than the thickness of the springs, and thus permit the body portions of the rollers to be wedged between the cam faces 19 and the surface of the shaft B.

Referring now to the retaining means C, and which is intended for preventing lateral movement of the pulley A on the shaft B, the same embodies a pair of clamp blocks 30 and 31 adapted to be clamped about the shaft B as by means of clamping bolts 32, at each end of the extensions or ears 14. These clamping blocks 30 and 31 serve as thrust collars against which the ends of the pulley A may rotate, and provide means whereby the pulley may be positioned at any desired location along the shaft B.

From the foregoing description it will be apparent that an improved and efficient type of split pulley has been provided whereby the pulley may be readily positioned upon a shaft at any desired location without first requiring the shaft to be removed from its hangers, and embodying roller clutch means for binding the pulley onto the shaft when the pulley is acted upon in one direction by a belt or other drive means, and which roller means creates a binding action throughout the greater portion of the length of the pulley and insures a good gripping action upon the shaft.

Changes in detail may be made to the specific form of the invention herein shown and described, without departing from the spirit of the invention or the scope of the following claims.

I claim:

1. A pulley comprising longitudinally divided sections, having bearing forming extensions provided at each end thereof, bolts passing through the extensions of the companion sections for securing the sections in assembled relation about a shaft, gripping rollers arranged longitudinally of each pulley section for binding engagement with the shaft when the pulley is acted upon in one direction, said gripping rollers having their ends terminating inwardly of the extensions of the pulley sections, and means carred by each pulley section for retaining the respective rollers thereof against displacement when the sections are in non-assembled relation.

2. A pulley comprising longitudinally divided sections provided at their confronting faces with longitudinally extending channels provided with cam surfaces, means for securing the sections in assembled relation about a shaft with the cam surfaces in confronting relation with the surface of the shaft, gripping rollers loosely disposed in each longitudinally extending channel and movable circumferentially of the pulley to be wedged between the cam surfaces of the channel and the shaft surface when the pulley is acted upon in one direction, and a retaining member carried by each end of each pulley section for retaining the rollers in their respective channels upon separation of the pulley sections.

3. A pulley comprising longitudinally divided sections each being provided with longitudinally extending channels terminating short of the ends of the sections and provided with cam surfaces, means for securing the sections in assembled relation about a shaft with the cam surfaces in confronting relation with the shaft surface, gripping rollers disposed in each channel and having reduced end portions, and retaining members carried by each section and overlying the terminal portions of the channels at the reduced end portions of the rollers for retaining the rollers in position in their channels when the pulley sections are separated.

4. A pulley comprising in combination, a pair of semicircular sections having aligning semicircular shaped grooves provided at each end thereof and at the confronting faces of the sections, said sections being provided between the semi-circular grooves with longitudinally extending independent channels having cam surfaces, means for securing the sections in assembled relation about a shaft with the semi-circular grooves rotatably engaging the shaft, gripping rollers arranged in each of the channels for wedging engagement between the cam surfaces of the channels and the shaft surface when the pulley is acted upon in one direction, half circular springs carried by each pulley section and extending across the ends of the channels for retaining the rollers in the channels when the sections are separated, and thrust collars adapted to be clamped about the shaft at each end of the pulley for preventing lateral movement of the pulley on the shaft.

5. A pulley comprising in combination a pair of semi-circular sections, having extensions provided at each end thereof, said sections each being provided with longitudinally extending channels terminating inwardly of the ends of the sections and provided with cam surfaces whereby the channels are of greater depth at one side than at the opposite side, clamping bolts passing through the extensions of the sections for securing the sections in assembled relation and rotatable upon a shaft, gripping rollers arranged in each channel for wedging relation between the cam surfaces of the channels and the shaft surface when the pulley is acted upon in one direction, means carried by each section and extending across the ends of the channels for retaining the rollers within their respective channels, and means adapted for clamping engagement with the shaft at each end of the pulley for preventing lateral movement of the pulley on the shaft.

FRANK J. HARDLEY.